United States Patent [19]
Lovelady

[11] 4,077,607
[45] Mar. 7, 1978

[54] SERVICING RACK FOR MOTORCYCLES

[76] Inventor: Grady R. Lovelady, 1625 San Altos Pl., Lemon Grove, Calif. 92045

[21] Appl. No.: 771,197

[22] Filed: Feb. 23, 1977

[51] Int. Cl.² .............................................. B60P 1/16
[52] U.S. Cl. ........................................ 254/88; 211/17
[58] Field of Search ............................ 254/88, 90–91; 211/17, 22

[56] References Cited
U.S. PATENT DOCUMENTS

| | | | |
|---|---|---|---|
| 3,863,890 | 2/1975 | Ruffing | 254/88 |
| 3,948,106 | 4/1976 | Armbruster | 254/1 |

FOREIGN PATENT DOCUMENTS

| | | | |
|---|---|---|---|
| 531,326 | 7/1931 | Germany | 211/17 |

*Primary Examiner*—Robert C. Watson
*Attorney, Agent, or Firm*—Brown & Martin

[57] ABSTRACT

A servicing rack for motorcycles and the like includes a base having a track supported upward therefrom with a stationary section of the track and a pivotal section of the track adapted to receive the wheels of a vehicle such as a motorcycle or the like and support the vehicle in an elevated position for servicing, with power means for lifting the pivotal section of the track and the vehicle to the elevated position. The rack includes clamping means for clamping one wheel of the vehicle in position for holding it in an upright position and for cooperating with an adjustable support stand for supporting the vehicle in a suspended position when the pivotal portion of the track is lowered to the supporting surface.

13 Claims, 5 Drawing Figures

SERVICING RACK FOR MOTORCYCLES

BACKGROUND OF THE INVENTION

The present invention relates to servicing racks and pertains particularly to a servicing rack for two wheeled vehicles of the motorcycle type.

It is desirable when performing maintenance and other types of service on vehicles such as motorcycles that the vehicle be positioned in an elevated position such that the mechanic does not have to work in a stooped position. The normal height of such vehicles is such that a mechanic performing maintenance or the like on such vehicles must normally stoop or assume a sitting or squatting position in order to reach the components of the vehicle. Such positions are extremely uncomfortable to maintain for any period of time.

Such vehicles can be placed on elevated platforms, however, this requires that a ramp or some form of lift be available for placing the vehicle on the platform. Both arrangements are space consuming and expensive.

Accordingly it is desirable that a servicing rack be available for servicing of motorcycles and the like that is compact and easy to use for elevating and supporting such vehicles into a servicing position.

SUMMARY AND OBJECTS OF THE INVENTION

Accordingly it is the primary object of the present invention to overcome the above problems of the prior art.

Another object of the present invention is to provide an improved servicing rack for motorcycle type vehicles.

A further object of the present invention is to provide a servicing rack for motorcycle type of vehicles having combined ramp and elevating support means for supporting a vehicle in a servicing position.

In accordance with the primary aspect of the present invention, a servicing rack for a motorcycle or the like includes an elevated stationary track with a moveable track portion defining a ramp leading to the stationary portion with power lifting means for lifting the ramp to a position horizontally with the stationary track. Clamp means are associated with the stationary portion for clamping one wheel of the vehicle and holding the vehicle in position.

BRIEF DESCRIPTION OF THE DRAWING

The above and other objects and advantages of the present invention will become apparent from the following description when read in conjunction with the drawings, wherein.

DETAILED DESCRIPTION OF A PREFERRED EMBODIMENT

Figure 1:
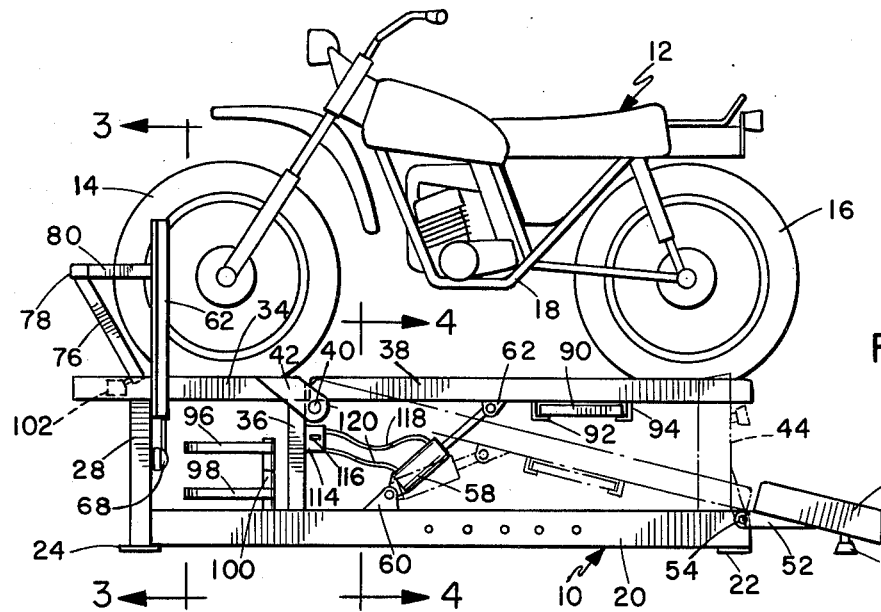
FIG. 1 is a side elevation view of a servicing rack in accordance with the invention, with a motorcycle in place.
Figure 2:
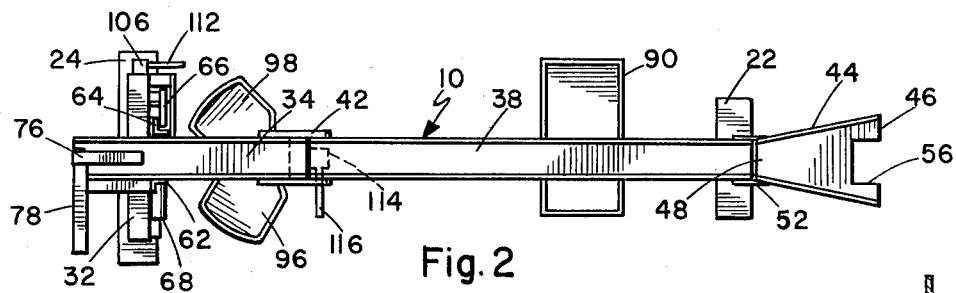
FIG. 2 is a top plan view of the rack.
Figure 3:
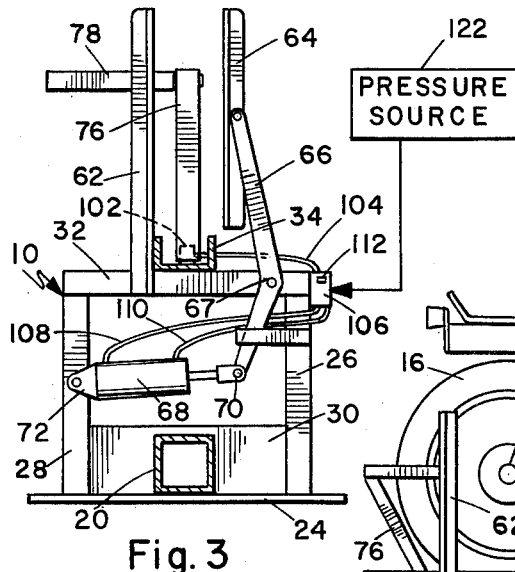
FIG. 3 is an enlarged sectional view taken on line 3—3 of FIG. 1.
Figure 4:
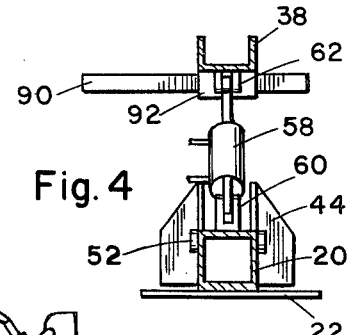
FIG. 4 is an enlarged sectional view taken on line 4—4 of FIG. 1.

Turning now to the drawing, particularly to FIG. 1, there is illustrated a rack designated generally by the numeral 10, in accordance with the present invention, supporting a motorcycle vehicle designated generally by the numeral 12 having front and rear wheels 14 and 16 rotatably supported on a frame 18.

The rack comprises a base member 20 of a generally box beam construction having front and rear generally outwardly extending feet 22 and 24 for supporting the base on a plane surface such as the floor or the like of a servicing area or building. A pair of upright support members 26 and 28 extend upward at the rear of the rack from the foot 22 spaced apart and braced by suitable brace member 30. These uprights support a cross bar member 32 on which is mounted a generally horizontally mounted stationary first portion of a support track or ramp 34. This track or ramp is a suitable configuration such as a channel iron extended or opening upward. The stationary portion of the track 34 is supported at its forward end by an upright support member 36 extending upward from the base member 20 to the forward end of the member 34. A second portion of the track 38 is pivotally mounted such as a pin 40 extending through brackets 42 on the end of member 34. This track portion 38 defines a ramp which may assume an inclined position as shown in phantom in FIG. 1 and in full line in FIG. 5, up which a vehicle may be pushed or driven to position one of the wheels 14 or 16 on the elevated stationary portion 34. The lower end (when inclined) of track member 38 rests on top of base member 20. The track portion 38 is likewise constructed of an upwardly opening U-shaped member such as a channel iron.

A converging guide member 44 having a generally fan shape converges upward from a wide end 46 resting on a floor or the like to a narrow end 48 for guiding the wheels of a vehicle up to and into the channel of track member 38. This guide member 44 includes a foot 50 resting on the support surface such as the floor of a building and is pivotally mounted by brackets 52 and pins 54 to the end of base member 20 in alignment with the end of the track member 38. This pivotal arrangement permits the guide member 44 to become a support post or the like when pivoted to the upward position as shown in FIG. 1, with a cutout portion 56 of a generally rectangular configuration for receiving the track member 38 when in that position.

A linear fluid motor 58 is pivotally connected at its lower end to a bracket 60 on the base member 20 and pivotally connected at its upper end to a bracket 62 on the lower side of the track member 38. This linear fluid motor 58 is controlled by a suitable source of fluid such as hydraulic fluid or compressed air, with a control system not shown. This motor is operative to lift the track member 38 from its inclined position to its horizontal position as in FIG. 1 and to lower the member to the inclined position.

Clamping means is provided on the rack for clamping either the front or the rear wheel of the vehicle for holding it in the upright position and for holding it as will be described later. This clamping apparatus comprises a fixed jaw 62 fixed to the side of track member 34 and extending upward therefrom. A movable jaw 64 is pivotally mounted on an arm 66 which in turn is pivotally mounted on a hinge pin 67 on cross support member 32 for carrying the movable jaw and is actuated by a fluid motor 68, which is pivotally connected at one end to the arm at 70 and at the opposite end 72 to upright support member 28. This arrangement is operative to clamp the wheel of the vehicle therebetween for holding the vehicle in the upright position. An automatic actuating member or pedal 76 is provided in the end of track member 34 extending upward at an angle as shown in FIG. 1 for being engaged by the wheel of the vehicle for actuating a control valve to be described which actuates fluid motor 68. The actuating member 76 is pivotally mounted at its upper end to brace or support members 78 and 80 secured to the jaw 62 of the clamping means.

Figure 5:
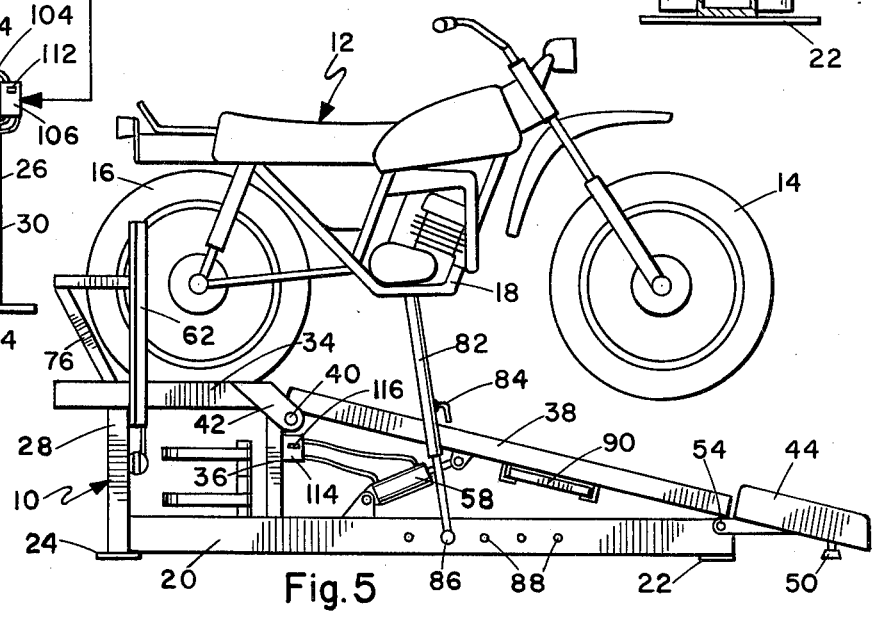
FIG. 5 is a side elevation view showing an alternate method of supporting a motorcycle on the rack.

Turning now to FIG. 5, an extensible support member 82 is disclosed having a telescoping arrangement with suitable clamping means 84 for securing the two telescoping members in selected relationship. The lower end of the stand includes a pin 86 for extending into selected ones of a plurality of holes 88 formed in the side of the base member 20. Thus, the lower end of the extensible support member 82 is pinned in any selected one of the holes 88 with the upper end thereof adjusted to its selected vertical position engaging the under side of the chassis or engine of the vehicle. With this arrangement, the vehicle can be supported in its upright position as shown in FIG. 5 while the pivoting track member 38 is lowered to its inclined position as shown. The vehicle may be supported in this manner in either its forward or reversed arrangement for permitting the suspended wheel to be removed from the vehicle. The opposite wheel of the vehicle is clamped between the clamping apparatus to hold the vehicle in its upright position and maintain its balance on the support members.

Additional features of the rack for conveniences includes a parts and tool tray 90 slidably mounted beneath the track member 38 in slides 92 and 94. This provides an easy and convenient place to place tools and parts when working on the vehicle. The tray is slidable back and forth to either side of the track member 38.

Additional parts and tool trays 96 and 98 are provided beneath the track member 34 and are pivotally mounted on a vertically extending post or support member 100. These trays may pivot out to either side of the track or beneath the track out of the way as desired.

In operation, a vehicle is loaded on the rack in either its forward direction as shown in FIG. 1, or its rearward direction as shown in FIG. 5, simply by rolling the vehicle up the track 38 inclined as shown in FIG. 5. Once the vehicle is in position with either the front or rear wheel activating the clamp and supported on the fixed elevated track 34, the motor 58 is activated by activating valve 114 by means of pedal 116 and the track member 38 pivots upward as shown in FIG. 1 supporting the vehicle in the horizontal position. If the work or service does not involve removal of the wheels then the vehicle may be supported on its wheels as shown in FIG. 1 with the guide member 44 pivoted up as shown in phantom for supporting the track 38 in its horizontal position. This permits relaxation of fluid pressure in fluid motor 58 if desired.

Should it be desirable to remove one of the wheels or work on the wheel of the vehicle, the vehicle may be supported as shown in FIG. 5, in which case a support member 82 is selected and positioned in selected one of holes 88 with the support extending to its desired position and engaging the chassis of the vehicle. Once the support structure 82 is in position the track member 38 is permitted to lower to its inclined position as shown by exhausting the fluid from the fluid motor 58. Thus as shown in FIG. 5, the front wheel, forks or any portion of the front of the vehicle may be removed for servicing, replacement, or the like.

A convenient control system is provided for controlling the power system of the servicing rack by a vehicle operator from astride the vehicle. This control system comprises a first valve 102 actuated by pedal 76 for operating the fluid clamping motor 68 which actuates the clamp jaw 64 for clamping the wheel of the vehicle. This valve 102 is operated automatically upon engagement of pedal 76 by the wheel (either front or back) of the vehicle. The valve is connected via conduit 104, a second valve 106 which in turn in connected via conduits 108 and 110 to motor 68.

The valve 106 includes an actuating pedal 112 which is positioned as that it can be easily acutated by the heel or toe of an individual while he is astride the vehicle without removing his hands from the handle bars. In the illstrated embodiment the valve 106 actuates the motor 68 to release the clamp jaw 64.

The lift motor 58 is controlled by a valve 114 having a foot actuating pedal 116 which is positioned to be easily actuated by the foot of an individual while he sits astride the motorcycle. The valve 114 controls the communication of pressurized fluid from a source 122 via conduits (e.g. flexible hoses) 118 and 120 to the motor 58. In a typical arrangement the pedal 116 may be lifted to actuate motor 58 to the raise condition and may be depressed or pushed down for the lower condition.

When removing the vehicle from the rack an operator may mount the vehicle (or sit astride it) grasp the handle bars for control, release the clamp member 64 by pressing lever 112 downward with his foot and then lower track member 38 to the inclined position by pressing lever 116 downward. He may then either roll or drive the vehicle from the rack.

While the present invention has been illustrated and described by means of a specific embodiment it is to be understand that numerous changes and modifications may be made therein without departing from the spirit and scope of the invention as defined in the appended claims.

Having described my invention, I now claim:

1. A servicing rack for in line two wheeled vehicles comprising:
   a base for resting on a plane support surface,
   a track supported by said base for receiving the wheels of a vehicle,
   said track including a first track member horizontally fixed a selected distance above said base, and a second track member pivotally mounted in alignment with one end of said first section, said second section pivoting downward to said support surface to define a ramp from said support surface to said second section and pivoting upward to a horizontal position for supporting said vehicle in an elevated position above said support surface,
   means for pivoting said second section to said positions, and
   clamping means for engaging the sides of one wheel of a vehicle for holding said wheel in position on said first section of track.

2. The servicing rack of claim 1, wherein said first and second track members comprise upwardly opening U-Shaped channel members for receiving the wheels of the vehicle.

3. The servicing rack of claim 1, including an elongated adjustable length strut member pivotally connected to said base member for extending upward for engaging and supporting a vehicle independently of said second track member.

4. A servicing rack for in line two wheeled vehicles comprising:
a base for resting on a plane support surface,
a track supported by said base for receiving the wheels of a vehicle,
said track including a first track member horizontally fixed a selected distance above said base, and a second track member pivotally mounted in alignment with one end of said first section, said second section pivotally mounted in alignment with one end of said first section, said second section pivoting downward to said support surface to define a ramp from said support surface to said second section and pivoting upward to a horizontal position for supporting said vehicle in an elevated position above said support surface,
a fluid motor connected to said second section for pivoting said second section to said positions, and
valve means positioned to one side of said rack in a position to be actuated by the foot of an operator astride a vehicle on said rack for controlling said fluid motor.

5. A servicing rack for in line two wheeled vehicles comprising:
a base for resting on a plane support surface,
a track supported by said base for receiving the wheels of a vehicle,
said track including a first track member horizontally fixed a selected distance above said base, and a second track member pivotally mounted in alignment with one end of said first section, said second section pivoting downward to said support surface to define a ramp from said support surface to said second section and pivoting upward to a horizontal position for supporting said vehicle in an elevated position above said support surface, said first and second track members comprise upwardly opening U-shaped channel members for receiving the wheels of the vehicle,
means for pivoting said second section to said positions, and
a converging guide member for guiding wheels of a vehicle onto said second track member when in said downward position, said guide member pivotally mounted to said base member for pivoting upward to an upright position for engaging and supporting said second track member in the horizontal position.

6. The servicing rack of claim 5 including a first parts and tool tray slideably mounted beneath said second track member, and a second parts and tool tray pivotally mounted beneath said first track member for pivoting outward to either side thereof.

7. The servicing rack of claim 5 including clamping means mounted on said first track member for clamping a vehicle wheel in position on said track member, and fluid motor means for operating said clamp means.

8. The servicing rack of claim 7, including on adjustable length strut for pivotally engaging selected one of a plurality of holes in said base member and for engaging the chassis of a vehicle on said rack for supporting said vehicle in an elevated position independently of said second track member.

9. The servicing rack of claim 8, including clamp actuating means at one end of said first track member extending upward at an angle thereto for engagement by the wheel of a vehicle on said track, and a pair of parts and tool trays pivotally mounted on a vertically extending support member beneath said first track member.

10. The servicing rack of claim 9, including a parts and tool tray slideably mounted in a track beneath said second track member.

11. A servicing rack for in line two wheeled vehicles comprising:
a base for resting on a plane support surface,
a track supported by said base for receiving the wheels of a vehicle,
said track including a first track member horizontally fixed a selected distance above said base, and a second track member pivotally mounted in alignment with one end of said first section, said second section pivoting downward to said support surface to define a ramp from said support surface to said second section and pivoting upward to a horizontal position for supporting said vehicle in an elevated position above said support surface, and
means for pivoting said second section to said positions,
clamping means for clamping one wheel of a vehicle in position on said first section of track,
a fluid motor for operating said clamping means, and
first valve means responsive to the wheel of a vehicle on said rack for activating said fluid motor.

12. The rack of claim 11, including second valve means disposed for actuation by the foot of an operator astride a vehicle on said rack for releasing said clamping means.

13. The rack of claim 12, wherein said means for pivoting said second section comprises a fluid motor, and
valve means disposed to one side of said rack for controlling said fluid motor.

* * * * *